United States Patent [19]

Nakata et al.

[11] Patent Number: 5,023,293

[45] Date of Patent: Jun. 11, 1991

[54] POLYARYLENE SULFIDE RESIN PAINT COMPOSITION

[75] Inventors: Akira Nakata; Naoki Yamamoto; Hiroshi Mori, all of Otake; Takuya Ueno, Kobe, all of Japan

[73] Assignee: Mitsubishi Rayon Co., Ltd., Tokyo, Japan

[21] Appl. No.: 476,627

[22] Filed: Feb. 8, 1990

[30] Foreign Application Priority Data

Feb. 9, 1989 [JP] Japan .................................. 1-030525

[51] Int. Cl.$^5$ .............................................. C08L 81/02
[52] U.S. Cl. .................................... 524/539; 525/437; 525/537
[58] Field of Search ................. 524/539; 525/437, 537

[56] References Cited

U.S. PATENT DOCUMENTS

| | | | |
|---|---|---|---|
| 4,140,671 | 2/1979 | Cohen | 524/412 |
| 4,717,609 | 1/1988 | Gaku et al. | 525/437 |
| 4,732,691 | 3/1988 | Wirth et al. | 252/515 |
| 4,871,810 | 10/1989 | Saltman | 525/185 |

FOREIGN PATENT DOCUMENTS 68367  4/1984  Japan .

Primary Examiner—Melvyn I. Marquis
Assistant Examiner—David W. Woodward
Attorney, Agent, or Firm—Cushman, Darby & Cushman

[57] ABSTRACT

A polyarylene sulfide resin composition comprising a composition obtainable by the reaction of a polymer composition comprising 100 parts by weight of a composition of 10 to 90 wt. % of a polyarylene sulfide resin and 90 to 10 wt. % of a thermoplastic polyester, 0.01 to 10 parts by weight of a polyfunctional oxazoline compound and 0 to 300 parts by weight, based on 100 parts by weight of the composition consisting of the polyarylene sulfide resin and thermoplastic polyester, of a filler. The polyarylene sulfide resin composition of the present invention, because of the polyarylene sulfide resin and the thermoplastic polyester having been made compatible with each other, is excellent in the adhesive property of paint film (paintability) and the appearance of the surface without a large reduction in the excellent heat resistance and mechanical properties inherent to the polyarylene sulfide resin.

8 Claims, No Drawings

POLYARYLENE SULFIDE RESIN PAINT COMPOSITION

The present invention relates to a polyarylene sulfide resin composition.

Demand for the polyarylene sulfide resin has recently increased as engineering plastics excellent in heat resistance, solvent resistance, hydrolysis resistance, flame retardancy and mechanical properties.

However, the polyarylene sulfide resin is poor in paintability. In other words, when a paint is applied to the surface of molded products produced from the resin and then cured, the adhesive property of the paint film is so poor that there has been a problem of this resin being difficult to use as a material for exterior use.

Since a thermoplastic polyester is superior in the paintability to the polyarylene sulfide resin, it has been tried to blend them. However, compatibility between them is insufficient, so that there has been a problem that the molded product lowers in the mechanical properties and becomes poor in the surface state.

In view of such a situation, the present inventors have eagerly studied the mixed composition of the polyarylene sulfide resin and thermoplastic polyester. As a result, the present inventors have found that by adding a particular compound to the mixed composition and causing the compound to react with the composition, the compatibility between the resin and polyester can be improved and the paintability (adhesive property of paint film) to the molded product can be raised. The present inventors thus attained to the present invention.

The present invention relates to a polyarylene sulfide resin composition comprising a composition obtainable by the reaction of a polymer composition comprising 100 parts by weight of a composition of 10 to 90 wt.% of a polyarylene sulfide resin and 90 to 10 wt. % of a thermoplastic polyester, 0.01 to 10 parts by weight of a polyfunctional oxazoline compound and 0 to 300 parts by weight, based on 100 parts by weight of the composition consisting of the polyarylene sulfide resin and thermoplastic polyester, of a filler.

An object of the present invention is to provide a polyarylene sulfide resin composition having excellent paintability.

Other objects and advantages of the invention will become apparent from the following description.

The polyarylene sulfide resin used in the present invention is a polymer having as a main constituent unit a repeating unit represented by the formula,

wherein Ar represents

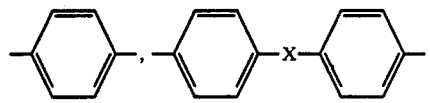

or a mixture thereof (in which X represents —SO$_2$—, —CO—, —O— or an alkylene group of which the main chain has 5 or less carbon atoms and may have 0-2 methyl side chains bonded thereto), and the above aromatic ring may have 1 to 3 halogen atoms or methyl groups as a substituent(s). Among these polyarylene sulfide resins, polyphenylene sulfide is more preferably used.

The thermoplastic polyester used in the present invention is not particularly limited. Particularly, it includes polyesters obtained from a dicarboxylic acid or its ester-forming derivative and a glycol. The dicarboxylic acid includes terephthalic acid, isophthalic acid, orthophthalic acid, naphthalenedicarboxylic acids, 4,4'-diphenyldicarboxylic acid, diphenyletherdicarboxylic acids, α,β-bis(4-carboxyphenoxy)ethane, adipic acid, sebacic acid, azelaic acid, decanedicarboxylic acid, dodecanedicarboxylic acid, cyclohexanedicarboxylic acid, etc. The glycol includes ethylene glycol, propylene glycol, butanediol, pentanediol, neopentyl glycol, hexanediol, octanediol, decanediol, cyclohexanedimethanol, hydroquinone, bisphenol A, 2,2-bis(4-hydroxyethoxyphenyl)propane, xylylene glycol, polyethylene ether glycol, polytetramethylene ether glycol, aliphatic polyester oligomers having a hydroxyl group at the both terminals.

In producing the thermoplastic polyester, the following comonomers may be used as an additional component: Hydroxycarboxylic acids such as glycolic acid, hydroxybutyric acid, hydroxybenzoic acid, hydroxyphenylacetic acid, naphthylglycolic acid, etc., and lactone compounds such as propiolactone, butyrolactone, valerolactone, caprolactone, etc.

Similarly, the following polyfunctional ester-forming comonomers may be used so far as the thermoplastic property can be maintained: Trimethylolpropane, trimethylolethane, glycerin, pentaerythritol, trimellitic acid, trimesic acid, pyromellitic acid, etc.

Further similarly, the following ester-forming comonomers having a halogen atom (e.g. chlorine, bromine) at the aromatic ring may be used: Dibromoterephthalic acid, tetrabromoterephthalic acid, tetrabromophthalic acid, dichloroterephthalic acid, tetrachloroterephthalic acid, 1,4-dimethyloltetrabromobenzene, tetrabromobisphenol A, adducts of tetrabromobisphenol A and ethylene oxide, etc.

Among these thermoplastic polyesters, preferred ones are those in which the intrinsic viscosity ($\eta$) in a mixed solvent of phenol and tetrachloroethane in a weight ratio of 6:4 is 0.3 to 1.5 dl/g at 30° C.

Specifically, a preferred thermoplastic polyester is polyethylene terephthalate, polybutylene terephthalate, polycyclohexane dimethylene terephthalate, etc.

In the present invention, the polyarylene sulfide resin and thermoplastic polyester are blended in a weight ratio of 90:10 to 10:90.

As the polyfunctional oxazoline compound used in the present invention, any of those having 2 or more oxazoline groups in the molecule may be used. Specifically, it includes 2,2'-(1,3-phenylene)-bis(2-oxazoline), 2,2'-(1,4-phenylene)-bis(2-oxazoline), etc. The amount of these polyfunctional oxazoline compounds is 0.01 to 10 parts by weight, more preferably 0.1 to 3 parts by weight based on 100 parts by weight of the total weight of the polyarylene sulfide resin and thermoplastic polyester. When the amount of the polyfunctional oxazoline compound is less than 0.01 part by weight, the compatibility effect between the resin and polyester becomes insufficient. When it exceeds 10 parts by weight, the flowability of the composition lowers at the time of molding.

The mixing ratio by weight of the polyarylene sulfide resin to the thermoplastic polyester can properly be changed, according to desired performances, between 90:10 to 10:90, if the mixing ratio of the polyfunctional oxazoline compound is within the above range.

The polyarylene sulfide resin composition of the present invention may contain a filler as an additional component in an amount of 0 to 300 parts by weight based on 100 parts by weight of the total weight of the polyarylene sulfide resin and thermoplastic polyester.

The filler may have any form of fibrous forms, powdery forms, granular forms and others. Examples of the filler include glass fibers, carbon fibers, potassium titanate, asbestos, silicon carbide, ceramics fibers, metal fibers, silicon nitride, aramide fibers, barium sulfate, calcium sulfate, calcium silicate, calcium carbonate, magnesium carbonate, dolomite, antimony trioxide, zinc oxide, titanium oxide, magnesium oxide, iron oxide, molybdenum disulfide, mica, talc, kaolin, pyrophyllite, bentonite, sericite, zeolite, attapulgite, wollastonite, other clays, ferrite, graphite, gypsum, glass beads, quartz, etc. When these fillers are used, their amount is preferably 300 parts by weight or less based on 100 parts by weight of the total weight of the polyarylene sulfide resin and thermoplastic polyester. When the amount exceeds 300 parts by weight, the melt-flowability of the polyarylene sulfide resin composition becomes poor, and therefore the appearance of the molded product undesirably tends to be injured.

In the polyarylene sulfide resin composition of the present invention, the polyarylene sulfide resin and thermoplastic polyester are mixed in good compatibility. Consequently, the composition is an excellent one having no problems such as reduction in mechanical properties and appearance as seen in the simply mixed composition.

Into the composition of the present invention may be incorporated if necessary a mold-release agent, coloring agent, heat stabilizer, ultraviolet light absorber, foaming agent, rust preventive, flame retardant, flame retarding assistant, etc., so far as the characteristics of the present composition are not much injured.

The polyarylene sulfide resin composition of the present invention is obtained by uniformly mixing the polyarylene sulfide resin, thermoplastic polyester and polyfunctional oxazoline compound and reacting these components. It is preferred, however, that the polyfunctional oxazoline compound is mixed with the two polymers, and then reacted therewith in a molten and mixed state.

When the filler is incorporated in the polyarylene sulfide resin composition, it may be allowed to coexist when the reaction of the polyfunctional oxazoline compound is carried out, or it may be added after the reaction. In other words, the filler may be added to a polymer composition comprising the polyarylene sulfide resin, thermoplastic polyester and polyfunctional oxazoline compound, or to a composition obtained by the reaction of the foregoing polymer composition.

It is desirable that the reaction of the polyfunctional oxazoline compound melt-mixed or kneaded with the polyarylene sulfide resin is carried out while passing the molten mixture or kneaded product through an extruder. In other words, it is desirable to carry out the reaction of the polyfunctional oxazoline compound in the inside of an extruder while passing a mixture of the polyarylene sulfide resin, thermoplastic polyester, polyfunctional oxazoline compound and if necessary the filler and other additives through an extruder under common extrusion conditions for a mixture of the polyarylene sulfide resin and thermoplastic polyester or under conditions similar thereto.

As compared with a blend wherein the resin and polyester are simply mixed in the same proportion as above, the polyarylene sulfide resin composition thus obtained is excellent in the compatibility between the resin and polyester. Further, since the resin and polyester are in a uniformly mixed state, the composition shows no phase separation even if it is passed through molding processes such as extrusion molding, injection molding, etc. carried out under normal conditions. Further, the molded product obtained is excellent in the adhesive property of paint film (paintability) and the appearance of the surface without a large reduction in the excellent heat resistance and mechanical properties inherent to the polyarylene sulfide resin.

The present invention will be illustrated in more detail with reference to the following examples. However, the present invention should not be construed to be restricted by these examples.

In the examples and comparative examples, the adhesive property of paint film was measured as follows: A paint is applied to the surface of a flat molded product and dried; 11 parallel grooves are cut into the paint film at intervals of 1 mm in one direction, and the same procedure is repeated in the direction perpendicular thereto, thereby forming 100 1 $\overline{mm^2}$ grid patterns; and adhesive tape is applied over the cross-hatched area and peeled off the area in the vertical direction to the surface of the flat molded product; and the number of the paint films peeled off the area is counted. The adhesive property of paint film is evaluated according to the following standard:

|  | The number of peeled paint films |
| --- | --- |
| Excellent [⊚] | 10 or less |
| Good [○] | 11 to 20 |
| No good [△] | 21 to 40 |
| Bad [x] | 41 or more |

The appearance of the flat molded product is visually inspected and evaluated according to the following standard:
Good [○]: The appearance is uniform and pearly luster is not observed over the whole surface.
Not good [△]: Pearly luster is observed only in the vicinity of the gate. Bad [x]: Pearly luster is remarkable.

EXAMPLES 1 TO 9 AND COMPARATIVE EXAMPLES 1 TO 4

A powdery polyphenylene sulfide resin (Tohpren T-4 produced by Tohpren Co., Ltd.; average particle size, 50 μm) was blended with a polyfunctional oxazoline compound shown in Table 1 on a Henschel mixer, and a polyethylene terephthalate resin (($\eta$)=0.7) was added thereto. The mixture was extruded through a twin-screw extruder (Werner & Pfleiderer 30 φ) at a barrel temperature of 300° C. and pelletized on a pelletizer.

The resulting pellet was molded into a flat plate of 100×100×3 mm in size on an injection molding machine (IS-100 produced by Toshiba Machine Co., Ltd.) under a condition that a cylinder temperature was 300° C. and a mold temperature was 140° C. The appearance of the plate was observed. The surface thereof was defatted by wiping it with methanol, and coated with an epoxy resin paint (Epona 2000 produced by Origin Denki Co.) under normal conditions. The peeling test was carried out. The results are shown in Table 1.

For the purpose of comparison, pellets were obtained in the same manner as in Example 1 except that the thermoplastic polyester and/or the polyfunctional oxazoline compound were not used as shown in Table 1. A flat plate was similarly molded and evaluated. The results are collectively shown in Table 1.

TABLE 1

|  | Example | | | | | | | | | Comparative Example | | | |
|---|---|---|---|---|---|---|---|---|---|---|---|---|---|
|  | 1 | 2 | 3 | 4 | 5 | 6 | 7 | 8 | 9 | 1 | 2 | 3 | 4 |
| Polyphenylene sulfide (part by weight) | 70 | 70 | 70 | 70 | 50 | 30 | 70 | 70 | 70 | 100 | 70 | 100 | 30 |
| Polyethylene terephthalate (part by weight) | 30 | 30 | 30 | 30 | 50 | 70 | 30 | 30 | 30 | 0 | 30 | 0 | 70 |
| Polyfunctional oxazoline compound (part by weight) | A 1 | B 1 | A 0.2 | A 3 | A 1 | A 0.5 | A 1 | A 1 | A 1 | — — | — — | A 1 | — — |
| Filler (part by weight) | — | — | — | — | — | — | C 40 | D 10 | E 10 | — | — | — | — |
| Appearance | O | O | O | O | O | O | O | O | O | O | x | O | x |
| Adhesive property of paint film | ⊙ | ⊙ | O | ⊙ | ⊙ | ⊙ | O | O | O | x | x | x | △ |

Note:
A: 2,2'-(1,3-Phenylene)-bis(2-oxazoline)
B: 2,2'-(1,4-Phenylene)-bis(2-oxazoline)
C: Wollastonite
D: Glass fiber
E: Carbon fiber

EXAMPLES 10 AND 11 AND COMPARATIVE EXAMPLES 5 AND 6

Procedure was carried out in the same manner as in Example 5 except that polybutylene terephthalate (hereinafter referred to as PBT) and polycyclohexanedimethylene terephthalate (hereinafter referred to as PCT) were used as a thermoplastic polyester in place of polyethylene terephthalate.

For the purpose of comparison, the above procedure was repeated except that the polyfunctional oxazoline compound was not used. The results are shown in Table 2.

TABLE 2

|  |  | Example 10 | Comparative example 5 | Example 11 | Comparative example 6 |
|---|---|---|---|---|---|
| Polyphenylene sulfide (part) |  | 50 | 50 | 50 | 50 |
| Thermoplastic polyester resin | Kind | PBT | PBT | PCT | PCT |
|  | Part | 50 | 50 | 50 | 50 |
| Polyfunctional oxazoline compound | Kind | A | — | A | — |
|  | Part | 1 | — | 1 | — |
| Appearance |  | O | X | O | X |
| Adhesive property of paint film |  | ⊙ | X | ⊙ | X |

EXAMPLE 12

Pelletizing, injection molding and evaluation were carried out in the same manner as in Example 1 except that the polyphenylene sulfide resin was changed to a straight chain-type one (M-2588 produced by Toray Phillips Co., Ltd.). As a result, the appearance was good [O], and the adhesive property of paint film was excellent [⊙].

What is claimed is:

1. A polyarylene sulfide resin composition consisting essentially of a composition obtained by the reaction of a polymer composition consisting of 100 parts by weight of a composition of 10 to 90 wt. % of a polyarylene sulfide resin and 90 to 10 wt. % of a thermoplastic polyester with 0.01 to 10 parts by weight of a compound having two or more oxazoline groups in the molecule and 0 to 300 parts by weight, based on 100 parts by weight of the composition consisting of the polyarylene sulfide resin and the thermoplastic polyester, of a filler.

2. A polyarylene sulfide resin composition according to claim 1, wherein the polyarylene sulfide resin is polyphenylene sulfide.

3. A polyarylene sulfide resin composition according to claim 1, wherein the polyfunctional oxazoline compound is 2,2'- (1,3-phenylene)-bis(2-oxazoline) or 2,2'-(1,4-phenylene)-bis(2-oxazoline).

4. A polyarylene sulfide resin composition accordingly to claim 1, wherein said composition is produced by mixing the oxazoline compound having two or more oxazoline groups in the molecule with the polyarylene sulfide resin and the thermoplastic polyester, and reacting the oxazoline compound with the polyarylene sulfide resin and the thermoplastic polyester in a molten and mixed state.

5. A polyarylene sulfide resin composition according to claim 1, wherein said composition is produced by mixing the oxazoline compound having two or more oxazoline groups in the molecule, the filler, and the polyarylene sulfide resin and the thermoplastic polyester, and reacting the oxazoline compound with the polyarylene sulfide resin and the thermoplastic polyester in a molten and mixed state.

6. A polyarylene sulfide resin composition according to claim 1, wherein the reaction of the oxazoline compound with two or more oxazoline groups in the molecule with the polyarylene sulfide resin and the thermoplastic polyester is carried out in the inside of an extruder.

7. A polyarylene sulfide resin composition according to claim 1, wherein the filler is a glass fiber or carbon fiber.

8. A polyarylene sulfide resin composition according to claim 1, wherein the thermoplastic polyester is one member selected from the group consisting of polyethylene terephthalate, polybutylene terephthalate and polycyclohexanedimethylene terephthalate.

* * * * *